UNITED STATES PATENT OFFICE.

GERHARD NICOLAAS VIS, OF PARIS, FRANCE.

PROCESS FOR TRANSFORMING ALKALI-METAL MONOCHROMATES INTO BICHROMATES.

1,310,720.  Specification of Letters Patent.  Patented July 22, 1919.

No Drawing.   Application filed January 22, 1918.   Serial No. 213,206.

*To all whom it may concern:*

Be it known that I, GERHARD NICOLAAS VIS, of 10 Ru de Vienne, Paris, France, chemist, have invented a new and useful Improvement in Processes for Transforming Alkali-Metal Monochromates into Bichromates, which improvement is fully set forth in the following specification.

The transformation of sodium or potassium chromates into bichromates is effected usually by the addition of sulfuric acid to their solutions; hydrochloric acid among other materials has been proposed for this purpose. In these cases the soda liberated is recovered in the form of sodium sulfate or chlorid or of the corresponding potassium salts.

According to this invention carbonic acid alone is made use of for this purpose and the process is based upon the fact hitherto unknown that the power of the chromic acid in the bichromates as against carbonic or its salts becomes less as the quantity of water present decreases.

If a solution of sodium monochromate containing about 40 parts of this salt to 100 parts of water is treated at the ordinary temperature with carbonic acid the color of the solution becomes changed from yellow to a reddish color which indicates the formation of bichromates: at this low concentration sodium bicarbonate will not be deposited, but if this concentration is exceeded, sodium bicarbonate is formed and deposited while sodium bichromate remains in solution.

A solution which contains, for example, 77 parts of sodium monochromate to 100 parts of water easily absorbs carbonic acid and after saturation 30% of the monochromate present will be transformed into bichromate while an equivalent quantity of the sodium bicarbonate is deposited.

For example, by employing a solution containing 106 parts of sodium monochromate to 100 parts of water, 65% of the monochromate will be transformed, and if there are 139 parts of sodium monochromate to 100 parts of water, 85% of the sodium chromate originally present will be transformed by the action of the carbonic acid alone. By diminishing the quantity of water a more complete transformation can be obtained, but the mass becomes very thick. This may be remedied by the addition of ethyl or methyl alcohol, acetone or any other suitable solvent. It is thus easy so to speak to absorb the carbonic acid necessary for the complete transformation of sodium monochromate into bichromate. The addition of these solvents produces the same effect as diminishing the quantity of water: that is to say, transformation is more complete in the presence of these solvents for the same quantity of water employed.

Sodium bicarbonate is substantially insoluble in concentrated solutions of sodium bichromate or in solutions mixed with these solvents. Sodium bicarbonate is separated from the solution which contains the entire bichromate content by filtration and washing; this latter product is obtained in a solid state by crystallization or evaporation to dryness.

The reaction is hastened by pressure and agitation.

Monochromates in a crystalline or anhydrous state may also be employed when mixed with a very small quantity of water. Solid products will thus be obtained which will consist of a bichromate and bicarbonate compound from which the bichromate may be extracted either with water or with the above mentioned solvents employed alone or mixed with water.

Potassium monochromate may be treated in the same manner and the separation of potassium bichromate from the potassium bicarbonate is facilitated by the almost complete insolubility of this latter salt in the said solvents even when mixed with water.

Claims:

1. The process for the transformation of alkali metal chromates into bichromates and bicarbonates consisting in subjecting a solution of alkali metal monochromate to the action of carbonic acid, in absence of free alkali, the concentration being such that the reaction product, alkali metal bicarbonate, precipitates from the resulting solution of the alkali metal bichromate.

2. The process for the transformation of alkali metal chromates into bichromates and bicarbonates consisting in subjecting a solution of alkali metal monochromate containing an organic solvent of the chromate to the action of carbonic acid in absence of free alkali, the concentration being such that the reaction product, alkali metal bicarbonate precipitates from the resulting solution of the alkali metal bichromate.

In testimony whereof I have signed this specification in the presence of two subscribing witnesses.

GERHARD NICOLAAS VIS.

Witnesses:
 JOHN F. SIMONS,
 GASTON DE MESTRAL.